July 20, 1954 G. TOURNON 2,683,915
METHOD OF MANUFACTURING STRUCTURAL ELEMENTS
OF PRESTRESSED REINFORCED CONCRETE
Filed Feb. 11, 1950 7 Sheets-Sheet 1

Inventor
Giovanni Tournon
By Robert E. Burns
Attorney

July 20, 1954  G. TOURNON  2,683,915
METHOD OF MANUFACTURING STRUCTURAL ELEMENTS
OF PRESTRESSED REINFORCED CONCRETE
Filed Feb. 11, 1950  7 Sheets-Sheet 2

Inventor
Giovanni Tournon
Robert E. Burns
Attorney

July 20, 1954

G. TOURNON

2,683,915

METHOD OF MANUFACTURING STRUCTURAL ELEMENTS
OF PRESTRESSED REINFORCED CONCRETE

Filed Feb. 11, 1950

Inventor
Giovanni Tournon
By Robert E. Burns
Attorney

July 20, 1954    G. TOURNON    2,683,915
METHOD OF MANUFACTURING STRUCTURAL ELEMENTS
OF PRESTRESSED REINFORCED CONCRETE
Filed Feb. 11, 1950    7 Sheets-Sheet 6

*Fig. 27*

Inventor
Giovanni Tournon
By Robert E Burns
Attorney

Fig. 28

Patented July 20, 1954

2,683,915

UNITED STATES PATENT OFFICE 2,683,915

METHOD OF MANUFACTURING STRUCTURAL ELEMENTS OF PRESTRESSED REINFORCED CONCRETE

Giovanni Tournon, Turin, Italy

Application February 11, 1950, Serial No. 143,626

Claims priority, application Italy
February 14, 1949

7 Claims. (Cl. 25—154)

This invention relates to a method of setting up elastic coaction conditions in bodies composed of two or a plurality of heterogeneous materials having different elastic deformabilities and such that they plasticize mostly at considerably different hydrostatic pressures.

I understand by "plasticizing hydrostatic pressure of a body" the hydrostatic pressure above which said body, if subjected to a suitable system of forces F superposed on the said hydrostatic pressure, may be deformed continuously without breaking and maintaining in full the impressed deformations after the said system of forces has ceased to act. If the various materials composing the compound body differ in mechanical properties, it is possible that the plastic deformations set up in some of said component materials by the system of forces F correspond in the other component to elastic deformations, so that, as the systems of forces F cease, if the bonds of a chemical, physical or mechanical nature between the various constituents are efficient enough to prevent relative movements thereof, a stress is set up in the plastically deformed materials such as to balance the tensions existing within the elastically deformed materials.

My improved method consists in placing a body composed of materials having conveniently differentiated physical-mechanical properties into an enclosed space under a sufficiently high hydrostatic pressure and in subjecting it to a suitable system of forces selected in such manner that part of the constituents undergo prevailingly plastic deformations and other constituents undergo prevailingly elastic deformations, the deformation of the compound body being effected in such manner that, on removal of said system of forces and hydrostatic pressure, conditions of coaction are set up between the various constituents of the body, adapted to improve the mechanical strength of the compound body against the stresses which it should withstand in use.

The invention shall be more particularly described with reference to the examples shown in the accompanying drawings, in which.

Figure 1:
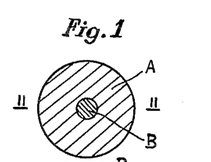
Figure 1 is a plan view of an improved body.
Figure 2:
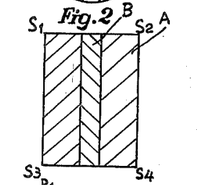
Figure 2 is a sectional view on line II—II of Figure 1.

Figures 1 and 2 show a cylindrical body composed of two different materials A and B, respectively. The elastic deformability of the body B is assumed to exceed considerably the elastic deformability of the body A. $p$ is the plasticizing hydrostatic pressure for the body B. The whole body is subjected to an hydrostatic pressure $p'$ higher than $p$ and, whilst the pressure on the outer cylindrical surface is maintained constant and equal to $p'$, the pressure acting on the end faces $S_1S_2$ and $S_3S_4$ of the cylinder is reduced to the value $p$. With a suitable value of the lateral pressure $p'$, the body B undergoes a plastic deformation which reduces it in section and increases it in length, the increase in length being followed by the body A. By keeping the elongation of the body B within determined limits, the body A is at the end of the operation elastically deformed and stressed. By annulling now all external forces, the body A tends to resume its initial length and transmits by adherence to the body B a compression stress equalling in absolute value the traction stress to which the former is subjected. The elastic coaction referred to above is thus set up in the compound body.

If, while the pressure on the cylindrical surface is maintained equal to $p$, the pressure acting on the end faces is brought to a suitable value $p''>p$, the compound body is set into a state of coaction contrary to the previous one that is, at the end of the operation, the internal part B is stressed while part A is compressed.

It is well known that in compound bodies it is frequently useful to make one of the components, which is then called reinforcement, in the form of cylindrical elements of small cross sectional area and considerable length. It will be obvious that, by the ordinary methods of setting up states of coaction in compound bodies, it is not possible to pre-stress reinforcements of substantially elongated form of which the critical shearing stresses are consequently practically nought.

My improved method permits to pre-stress and pre-compress at will reinforcements even in one and the same body by the same operation. The following example applied to the classical case of a bent girder will make the above statement clear.

Figures 3, 4:
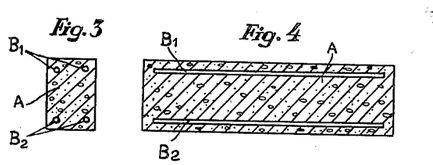
Figures 3 and 4 are a front and side view, respectively, of a reinforced girder.
Figure 5:
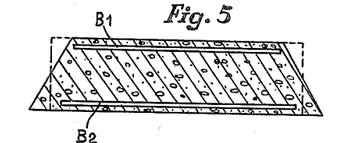
Figure 5 shows the girder according to Figure 4 after its plastic deformation.
Figure 6:
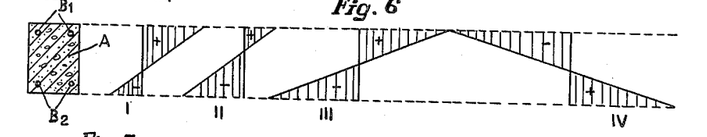
Figure 6 is a diagram of the deformations of the girder shown in Figure 4.

The girder shown in Figures 3 and 4 is assumed to be made of a material A equalling in absolute value of the safety tensile stress the safety compression stress, and of a material B arranged in two reinforcement units $B_1B_2$, which are drawn as close as possible to the upper face and lower face of the girder, respectively. It will be assumed that the material B considerably exceeds the material A in safety stresses and elastic deformability. Obviously, the material A will be best utilized by setting up therein a system of tensions contrary to the tensions to which the non-processed material would be submitted by the bending moment the girder is called upon to withstand in use. In order to obtain this coaction conditions, the girder may be subjected to an hydrostatic pressure exceeding the plasticising pressure of the material A and be deformed, for instance, from its initial shape (Figure 4) to the shape shown in Figure 5; this operation will tension the reinforcements $B_2$ and compress the armatures $B_1$. On eliminating all the external forces, the state of coaction conferred to the body A by the armature $B_1$ may be shown by a diagram of the type indicated by I in Figure 6, in which $+$ denotes traction stresses and $-$ denotes compression stresses. The state of coaction conferred to the body A by the armature $B_2$ may be shown by a diagram of the type indicated by II in Figure 6. By superposing the two diagrams the diagram III of Figure 6 is obtained, showing a distribution of tensions contrary in direction to the tensions which would arise in a girder which has not been processed or subjected to the operating bending moment (Figure 6—IV).

The methods known heretofore of manufacturing compound bodies in an elastic coaction condition imply the use of continuous reinforcements which have to be tensioned by acting at their ends external of the body to be placed in a coaction state.

With my improved method, the desired coaction states may be obtained by utilising discontinuous reinforcements, even wholly enclosed in the body, provided they adhere to the body in which they are embedded and are mutually superposed in such manner that the necessary continuousness in the distribution of the stresses and in the state of coaction throughout the body is afforded.

The discontinuity in reinforcement may be particularly accentuated, and the reinforcements may be in the form of fibres, straw . . . lamellae and the like, suitably distributed and directed within the body in which the state of elastic coaction is desired.

The possibility of utilising discontinuous reinforcements is of importance, inasmuch as materials may be employed, of which the mechanical properties could otherwise be utilised but on a reduced scale.

It is known, for instance, that glass, of which the critical tensile stress is about $150+300$ kgs./sq. cm., when reduced to thread-like elements of very small diameter of the order of microns, shows a mechanical strength of about $20,000+40,000$ kgs./sq. cm., which is by far superior to that of the best steel. This increase in strength is combined with a considerable reduction in the modulus of elasticity, which is likewise very useful for the purposes in view.

These extraordinary mechanical properties of glass fibres may be suitably utilised by my improved process, by incorporating them in a substance, such as synthetic resins, cement, conglomerates, etc., which is easy to plasticize in the above described manner, and in subjecting said body to plastic deformations such as to set up the desired tension and compression in the glass fibres.

In the case of bent girders, for instance, the glass fibres, preferably directed along the girder axis, may be more or less uniformly distributed in the girder body.

Figure 7:
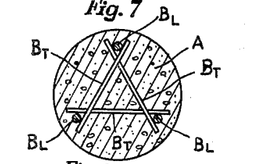
Figures 7 and 8 show a body provided with longitudinal and cross reinforcement.
Figure 8:
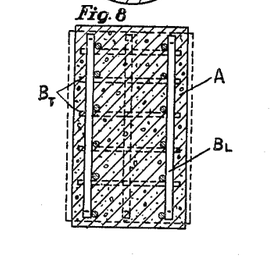

By operating in the manner described above in connection with the girder having continuous and localised armatures, similar effects will be obtained. The example shown in Figures 1 and 2, that is a compound cylinder adapted to withstand in use axially directed stresses of simple traction or compression will now be considered. The above mentioned relation between the mechanical properties of material A and reinforcement B being maintained, it will be obvious that higher strength in use may be obtained by adding, as indicated in Figures 7 and 8, to the longitudinal armatures $B_L$, cross reinforcements $B_T$. In fact, since the body shall undergo in use simple traction stresses, it is subjected in manufacture in the previously described manner to plastic elongations implying reductions in diameter. The cross reinforcements $B_T$ are thereby pre-compressed and, on elimination of the manufacturing pressures, the radially pre-tensioned body A shall be pre-tensioned. This state of transverse coaction obviously gives rise to an increased strength against simple traction stresses mentioned above.

If the body shall undergo in use simple compression stresses, it should be subjected in manufacture to plastic reduction in length and consequent increase in diameter. The transverse reinforcements are in this case pretensioned and the body A is transversely pre-compressed, which implies an increase in strength against simple compression in use.

Assuming now the double system of reinforcements $B_L$, $B_T$ described above is replaced by a system of reinforcements in the form of elastic fibres arranged in any direction and uniformly dispersed in the body A, it will be inferred that, by subjecting the body to plastic deformations similar to those described above, a similar state of coaction will result therein.

In fact, assuming the body should withstand in use simple compression stresses, the longitudinally directed fibres will be pre-compressed and will perform a function similar to that of the longitudinal reinforcements $B_L$, while the transversely arranged fibres are pre-tensioned as a result of the radial expansions in the body, and perform a function comparable with that of the cross reinforcements $B_T$ dealt with above.

If the body in which the elastic fibres are uniformly dispersed is of properties such that it is plastically deformed under the mere action of hydrostatic pressures exceeding the plasticizing pressure and acting uniformly throughout the body surface causing therein permanent appreciable reductions in volume, as in the case of porous bodies, it will be possible, by subjecting the body to such pressures, to compress each individual fibre and set up therein a triaxial uniform tensioned condition.

It has been found experimentally that cementitious conglomerate, which has set and thoroughly hardened, if subjected to considerable hydrostatic pressure $p(700+2000$ kgs./sq. cm.) behaves like a plastic substance so that, by superimposing on the hydrostatic pressures a further system of forces F' of convenient intensity and directions, the cementitious conglomerate is indefinitely deformed without breaking, and thereafter fully maintains the deformations it has undergone after the action of the system of forces F' and hydrostatic pressures $p$ ceases. The same experiments have shown that, if the plastic deformations are maintained within certain limits, the mechanical properties of a concrete having undergone the said treatment are considerably improved over those of the original concrete. More particularly, the conglomerates processed show an increase in specific weight of the order of 10%, higher mechanical strength, higher modulus of elasticity, improved superficial hardness and strength against physical-chemical agents over non processed conglomerates.

It has further been ascertained that, if the hydrostatic pressure is applied with certain precautions, it is possible to remove from the cementitious conglomerate in a state of advanced hardening and apparently dry, a considerable quantity of water, thereby obtaining a material which is extraordinarily compact and tough. The results of experiments have led to the use of the method in the production of prefabricated pre-stressed concrete elements.

It is known that the technique of the manufacture of reinforced cementitious conglomerate in a coaction state has not beeen applied heretofore on a wide commercial scale owing to several drawbacks and difficulties which have been met with, and which may be summarized as follows:

1. In the case of structures with adhering reinforcements, the necessity of maintaining said reinforcements constantly, tensioned and to lay still an expensive apparatus till the concrete cast has fairly hardened;

2. In the case of structures with non-adhering reinforcements, constructional complications and difficulties in providing the seats for the reinforcements, in locking these by means of end attachments and preserving them;

3. In either case, difficulty in providing an arrangement of the reinforcements such as to suit the various resisting sections to the type and extent of the stresses which are due to occur in use.

These drawbacks and difficulties are eliminated by my improved method, according to which I manufacture elements of reinforced cementitious conglomerate very similar in form and size to the definitely desired structures. The reinforcements consists of high-strength steel wires and may be arranged within the body as freely as they are usually arranged in ordinary reinforced concrete, in order to obtain resisting sections which suit in the best manner the stressed condition which will occur in use of the element to be manufactured.

The smooth or twisted wires up to a diameter of three millimeters do not require any end attachment. With higher diameters, the ends of the iron bars may be provided with suitable deformations (bends, hooks, etc.) acting as end fastenings. These conglomerates which should be made of a rich mixture (400 to 600 kgs. cement per cubic meter) including inert components of suitable corn size are cast in moulds preferably made of metal and carefully rammed by vibration or centrifugation, whereupon they are allowed to set. On partial setting after 1 to 7 days, the elements are brought to appropriate apparatus, some constructions of which shall be described, capable of subjecting the element to considerable hydrostatic pressures (700 to 2000 kgs./sq. cm.). In this step the hydrostatic pressures are maintained, while the element is plastically deformed by means of a system of forces in such manner that the armatures carried along by the concrete, as it is plastically deformed, are brought to the desired state of tension. The deforming system of forces is then cut off and the hydrostatic pressure is gradually brought down to zero. The element may then be promptly removed from the machine and used.

The plastic deformation and tensioning of the reinforcing iron is very quick to perform, and does not take more than a few minutes. This is the reason for the high capacity of the machines described hereafter.

Tensioning of the irons by the concrete which is being plastically deformed may occur through tangential adherence stresses, when the conglomerate is deformed in the same direction as the reinforcing element, or through normal stresses when the conglomerate is deformed perpendicularly to the direction of the reinforcement, or through combined tangential and perpendicular stresses.

This method of tensioning the reinforcements obviously eliminates any provisional anchoring of the irons for pre-stressing them since, as explained above, the conglomerate itself performs tensioning of the reinforcement.

The method may broadly be compared with hot pressing of metals, the plasticizing action of high temperatures on metal being replaced by the plasticizing action of high hydrostatic pressures on the conglomerate.

As mentioned in the general statement of the method, the reinforcements may be stressed by traction or compression. This double possibility is novel, for the known methods of setting up a state of coaction in cementitious conglomerates do not permit of precompressing steel reinforcements of a very slender structure down to a thread-form, of which the critical shearing stresses are practically nought.

The possibility of pre-compressing reinforcements in order to obtain pre-tensioned conglomerates becomes of considerable importance when cementitious or other conglomerates adapted to satisfactorily withstand tension stresses are desired, but may already now be usefully employed in some special cases, as will clearly appear from the following considerations.

It is known that in structures of reinforced cementitious conglomerate subjected to simple compression stresses, the steel armature is very poorly utilised, for, even when the concrete works under 50 kgs./sq. cm. and even admitting a ratio $$n = \frac{E_f}{E_c} = 10$$

($E_f$=modulus of elasticity of steel, $E_c$=modulus of elasticity of the conglomerate), the steel would work at not more than 500 kgs./sq. cm.

By pre-compressing the reinforcements according to my improved method the mechanical properties of steel are fully utilised.

Figure 9:
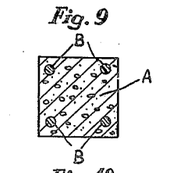
Figure 9 is a plan view of a pillar.
Figure 10:
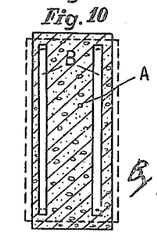
Figure 10 is a side view of Figure 9.

Considering, for instance, a prismatic element of reinforced concrete of the type shown in Figures 9 and 10, adapted to resist an axial centered compression stress. Assuming said element is subjected to an hydrostatic pressure $p$ higher than the plasticizing pressure of the conglomerate and a further compression stress is exerted on the end faces, which elastically deforms the prism that decreases in length and increases in section (see the prism shown in dotted lines). The longitudinal reinforcements B undergo by this operation reductions in length by unit of length equalling those of the prismatic body, consequently, they will be more or less pre-compressed according to the extent of plastic deformations undergone by the body.

On removal of the deforming forces and hydrostatic pressures the reinforcing irons B tend to resume their initial length and transmit to the conglomerate the traction stresses. These stresses by unit may exceed the critical tensile stress of the conglomerate and the latter may crack. This, however, does not exclude the possibility of an improved utilisation of the mechanical properties of steel. For, on accidental application of load in use, the load will be fully taken up at the cracks by the reinforcements till the cracks close again and the prism behaves like a monolithic body. The prism reacts henceforth to compression stresses in the usual manner, according to the ratios of surfaces and moduli of elasticity of the steel and conglomerate. By suitably adjusting the extent of plastic deformations of the conglomerate, it is possible to cause the concrete and steel to reach in use their respective safety loads.

In the general description of the invention, I have considered further increases in strength against compression in use deriving from the utilisation of transversely arranged reinforcements, that is, reinforcements situated in planes perpendicular to the axis of the body along which the latter is subjected to compression.

In the case of elements of cementitious conglomerate (Figures 11 and 12) said transverse armatures may conveniently be in the form of continuous encircling round iron, for instance a helix of round wire $B_t$ wound about the longitudinal irons $B_L$.

Figure 11:
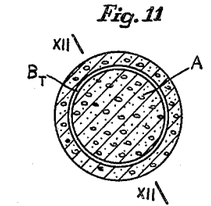
Figure 11 is a cross sectional view of a structural member of cementitious conglomerate with longitudinal and circular surrounding reinforcement.
Figure 12:
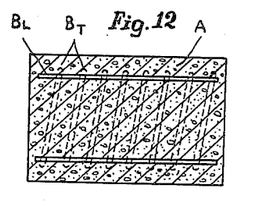
Figure 12 is a sectional view on line XII—XII of Figure 11.

The same plastic deformation of the conglomerate which pre-compresses the longitudinal reinforcements, pre-tensions the encircling reinforcements by transverse expansion of the conglomerate. This results in a forced encircling of the internal conglomerate core, further increasing the strength against compression in use.

Figures 13, 14, 15:
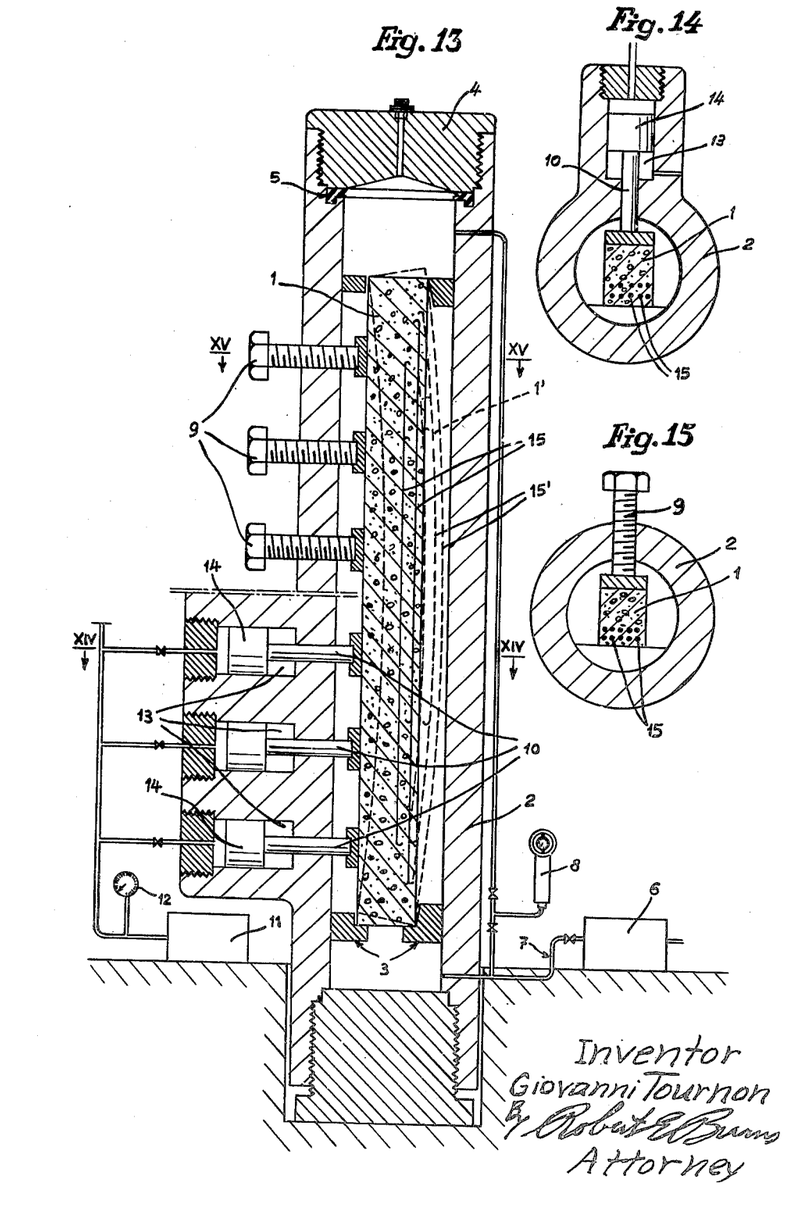
Figure 13 is a longitudinal section of an apparatus for manufacturing girders of pre-stressed reinforced concrete according to my invention.
Figures 14 and 15 are sections on lines XIV—XIV and XV—XV, respectively, of Figure 13.

I will describe a manner of employing my improved method in connection with the manufacture of pre-compressed reinforced concrete girders with reference to Figures 13, 14 and 15.

The concrete girder 1, which may be made of a length, shape and with a reinforcement selected at will in accordance with requirements, is introduced into a tubular steel container having thick walls and calculated to withstand inner hydrostatic pressure up to 3,000 atmospheres.

The container is filled with fluid tar by an extent such that, after introducing therein the girder to be processed, it is quite full. The tar used is of a viscosity such that the girder to be pre-compressed may be easily introduced therein, and may be made more or less viscous by adequately adjusting its temperature.

The girder introduced into the container 2 rests on suitable seatings 3.

The tubular container is closed by means of a screw plug having a discontinuous screw-thread, such as used in ordnance guns, in order to permit full tightening by a fraction of a turn only.

The plug, when tightened, compresses by the edge of its lower face a plastic ring 5, which affords a tight seal. Once the container is tightly closed, the tar contained therein is subjected to high hydrostatic pressures, for instance by direct pumping further tar quantities into the container through a system of multiplying pumps and flasks 6 and pipe 7, or by acting on the tar by means of pistons operated by any suitable fluid (water, oil, etc.) placed under the necessary hydrostatic pressure by any known means.

The system of multiplying pumps and flasks is provided in either case in order to exert on the tar pressures up to 2,000 atmospheres, under which normal cementitious conglomerates may be considered plasticized.

The tar pressure may be conveniently measured with an accuracy of 10–15 kgs./sq. cm. on 2000 kgs./sq. cm. by means of a pressure gauge 8 having a piston and dynamometric ring.

While the hydrostatic pressure attained is maintained practically constant in the container 2, the girder 1 is directly acted upon by means of a system of screws 9 actuated from the outside in known manner.

In order to accelerate the operations, the girder may be acted upon, instead of by means of the screws 9, by a plurality of pins 10. A fluid under the desired pressure is pumped by means of an auxiliary pump 11, the fluid pressure being checked by means of a pressure gauge 12 within cylinders 13 formed in a structure fixedly connected with the container 2, pistons 14 actuating the pins 10 moving within said cylinders. The desired stresses may thereby be exerted on the conglomerate girder to be processed.

The horizontal forces applied by means of the screws 9 or pins 10 bend the girder 1 and, if they are high enough, elastically deform said girder in the manner shown by the dotted line 1' in the drawing.

The irons reinforcing the girder, which are of the shape 15 before plastic bending, are carried along by the concrete which is being plastically deformed and ultimately take the shape denoted by 15' in which they are tensioned as a result of the elongation they have undergone.

For the sake of a generic and clear representation, the drawing shows a deliberately simple and diagrammatic arrangement of the irons. It is, however, obvious that the reinforcement may be without difficulty, when convenient, any possible more elaborate form, and plastic deformations may be carried out by more or less elaborate distortions of the girder, which may even be conferred by a sequence of operations.

The deformations conferred may be easily checked and measured by means of mechanical, electric, or electro-mechanical systems of any type.

Figures 16, 17, 18:
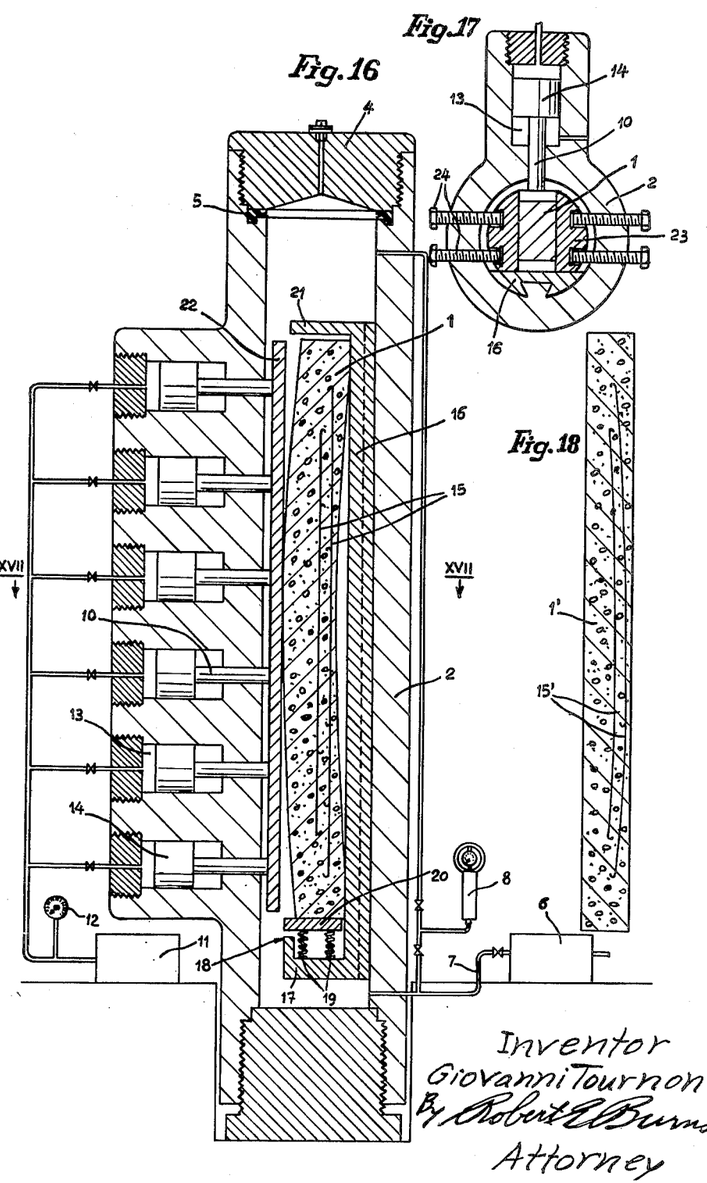
Figure 16 is a longitudinal section of a further apparatus for manufacturing pre-stressed concrete girders.
Figure 17 is a section on line XVII—XVII of Figure 16.
Figure 18 is a longitudinal section of a reinforced girder obtained by the apparatus shown in Figures 17 and 18.

The described method gives more or less curved finished girders. When it is desired to obtain girders with a perfectly straight axis, initially curved girders may be processed and plastically straightened by an operation similar to that described for plastically curving initially straight girders, which confers to the reinforcement the desired tension. The apparatus for carrying out the latter operation is shown in Figures 16, 17 and 18.

The initially curved girder 1 is supported laterally on the side on which it should be deformed by a vertical steel platform 16. Said platform may slide on suitable guides fixedly connected with the tubular container 2 (see Figure 17) and may be easily introduced into and removed from the latter together with the girder to be processed. The lower end of the platform 16 has rigidly connected therewith the overhanging member 17 provided with an abutment surface 18 and supporting, through a system of springs 19, a plate 20 forming the lower support for the girder 1. The system of springs 19 is such as to support the weight of the girder 1 less the hydrostatic thrust exerted by the fluid tar. The top end of the platform 16 ends by a rigid stop plate 21. The plastic deformation straightening the girder is obtained by drawing the platform 22 towards the platform 16 until the curved faces of the girder rest throughout their length on the platforms 22 and 16.

The movable platform 22 is actuated from the outside of the tubular vessel by means of a number of pistons 10 similar to those described above and acting in a similar manner.

The spacing between the top end face of the girder 1 and stop plate 21, and between the lower face of the movable plate 20 and abutment surface 18 correspond to the elongation which the girder should undergo during its straightening by plastic deformation. In order to prevent any lateral distortion of the girder during deformation, for instance as a result of a certain asymmetrical arrangement of the reinforcement, lateral guide jaws 23 are provided. These guide members are adjustable from the outside by means of strong screws 24, in order to suit the initial variations in thickness of the girder and facilitate removal of the girders from the machine at the end of the process.

The final shape of the girder shows a rectilinear axis and is denoted by 1' in Figure 18.

The reinforcement of the girder which was before processing of a rectilinear shape 15, is ultimately of a curvilinear shape 15' in which it is tensioned by effect of the elongation it has undergone. The same remarks set out in connection with the previous embodiment apply to the arrangement and shape of the reinforcement in this case.

With the last described arrangement, direct checking and measuring of the deformation are not essential for a satisfactory pre-compression process, for the plastic straightening of the girder may be pursued until its result is negative, that is, till the moment at which the lower girder face is fully in contact with the plate 22 and the end faces are in contact with their respective check members. This condition may be detected by the reading of the pressure 12, when a sharp increase in the pressure readings is ascertained, for the pump 11 operates at uniform delivery.

The generic principle of construction described above may be used in connection with the processing of girders of precompressed cementitious conglomerate in various manners other than mentioned above. More particularly, I may employ, instead of tar, any other substance useful as pressure fluid, for instance, kerosene, or even liquids of low viscosity, provided the surfaces of the conglomerate elements are water-proofed by means of suitable elastic paints or are protected against trickling of pressure liquid by means of rubber hoses.

The tri-axial compression state, which should be set up in the conglomerate to make it capable of withstanding without breaking considerable plastic deformations, may be obtained in certain cases even without the intermediate action of a fluid, merely by the use of metallic molds of the type which shall now be described.

Figure 19:
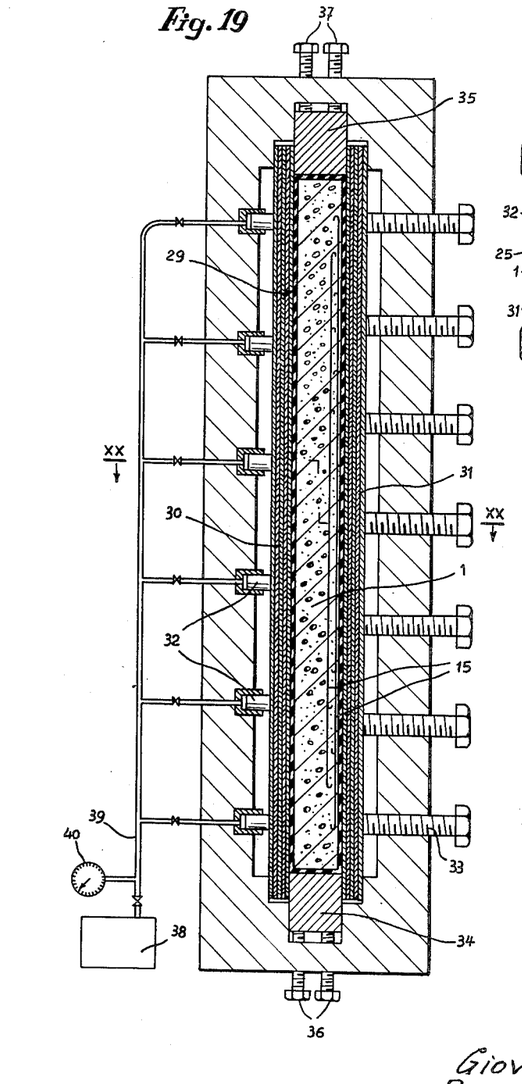
Figure 19 is a longitudinal section of a still further apparatus for manufacturing pre-stressed concrete girders.
Figure 20:
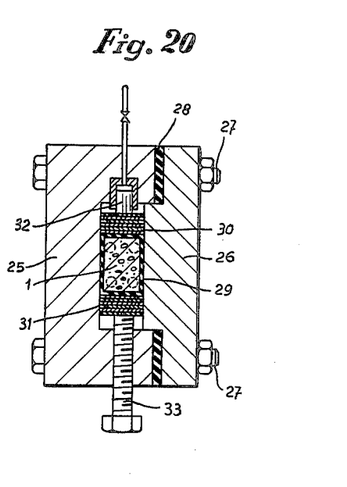
Figure 20 is a section on line XX—XX of Figure 19.

Referring to Figures 19 and 20, the apparatus comprises two strong metal moulds 25 and 26 which may be juxtaposed and contain in the hollow formed the conglomerate element 1 to be processed.

The two molds may be connected together by means of a number of bolts 27 through the interposition of a resilient packing 28.

All the surfaces of the conglomerate element to be processed are coated with a layer of elastic material 29 (rubber, cardboard, etc.), adapted to uniformly distribute the stresses between the conglomerate and adjacent metallic surfaces. I place opposite the opposed girder faces two layers of superposed steel leaves 30, 31. A plurality of hydraulic jacks 32 is placed between the layer of leaves 30 and the inner surface of the mould, while the layer of leaves 31 rests on the ends of a number of screws 33. The screws 33 may be conveniently replaced by a further system of jacks similar to the jacks 32.

The movable walls 34 and 45 may be brought by means of the screws into contact with the end faces of the element to be processed.

After the girder 1 has been placed into the mould 25, 26 the bolts 27 are tightened and the screws 36, 37 are acted upon in order to exert an initial pressure on the outer faces of the conglomerate element. The jacks 32 are operated by means of the pump 38, pipe 39 and pressure gauge 40 in order to exert the desired pressure on the side faces, whereby a state of tri-axial compression is set up in the conglomerate similar to that set up by the pressure fluid provided in the previously described embodiment.

The screws 33 are then properly loosened and the plastic deformation of the conglomerate element is obtained by bending, the two layers of steel leaves 30 and 31 serving to guide the girder during plastic bending and to even on the cooperating surfaces of the conglomerate the forces transmitted by the jacks 32 and screws 33. The effects deriving from this plastic deformation are similar to those described in connection with the embodiment shown in Figure 13, 14 and 15.

Obviously, my improved method of tensioning the reinforcements affords the best advantages when discontinuous or non rectilinear reinforcements have to be used, that is, reinforcements which cannot be seized at their ends and tensioned by pulling said ends in contrary directions.

This may occur in manufacturing tubes of precompressed concrete.

Concrete pipes which are subjected in use to internal pressures belong to the structures in connection with which pre-compression affords its chief advantages, for said pipes are mainly subjected in use to traction stresses.

Methods of manufacturing pre-compressed concrete pipes are known, but none of them are exempt from serious inherent drawbacks.

The main drawbacks of said known methods may be summarised as follows:

(1) Difficulty and complication in construction in carrying out two pre-tensioned systems of reinforcements, namely a longitudinal and a circular encircling one, (2) Necessity of maintaining the reinforcements tensioned till the conglomerate has fairly set, thereby tying up the tensioning apparatus over a more or less long period.

The drawbacks and faults of known methods are overcome by suiting my generic method described above to the manufacture of concrete pipes.

Figure 21:
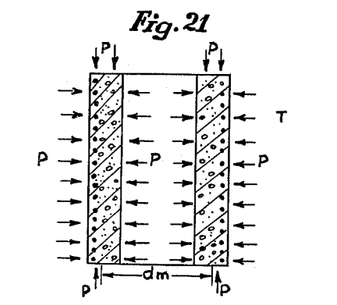
Figures 21 and 22 are diagrams showing the manner of radially pre-stressing tubes of reinforced concrete.

A suitably reinforced (Figure 21) concrete pipe T is manufactured even by ordinary means and introduced, after setting, into an apparatus which subjects it to an hydrostatic pressure $p$ exceeding the plasticizing pressure of the conglomerate. While the outer pressure $p$ is maintained at a rate exceeding said plasticizing pressure, a certain difference in pressure is created between the inner and outer tube portions, the inner pressure exceeding by $D'_1 p$ the outer pressure $p$. As a result of a sufficient drop in pressure between the inside and outside of the pipe, the latter will be plastically deformed (Figure 22), whereby the mean diameter $dm$ is increased to $d'_1 m$ and the radial reinforcement is carried along and tensioned by the concrete.

Figure 22:
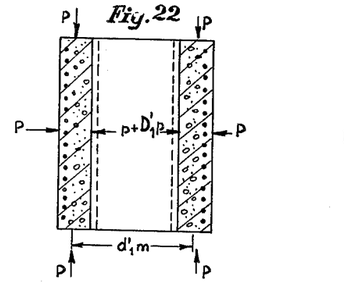

Upon deformation and consequent tensioning of the reinforcement, the inner and outer pressure are reduced according to a proper law till they are fully eliminated. The pipe, which is now radially pre-compressed, may be removed from the machine and directly used.

When a tri-axial (radial and longitudinal) pre-compression is desired, the reinforcement to be tensioned may be formed by two systems of irons, namely a longitudinal and an encircling circular system. In order to tension the longitudinal iron system, it would be necessary to perform an additional step.

Figure 23:
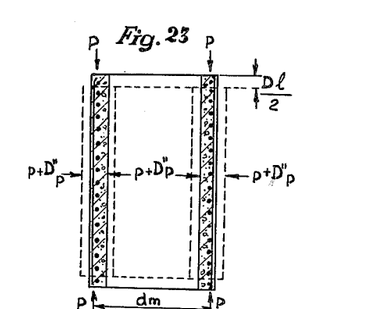
Figures 23 and 24 are diagrams showing the manner of radially and longitudinally pre-stressing tubes of reinforced concrete.

This step consists in placing the pre-fabricated concrete pipe under the conglomerate plasticizing pressure $p$, maintaining equal to $p$ the pressure acting on the end faces of the pipe (Fig. 23), increasing by a value $D''p$ the pressure acting on the inner and outer cylindrical surfaces. With a sufficient drop in pressure $D''p$, the pipe undergoes plastic elongations $dl$ which set up in the longitudinal reinforcement the desired tension.

Figure 24:
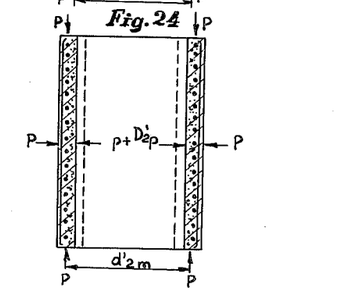

Tensioning of the encircling irons is performed by a similar operation, for instance by annulling the overpressure $D''p$ and successively raising the inner pipe pressure by an extent $D'_{2}p$, in order to increase the mean pipe diameter as required from the value $dm$ to $d'_2 m$ (Figure 24) and set up the required tension in radial reinforcements. On removal of the system of hydrostatic pressure the pipe conglomerate is in a radially and longitudinally pre-compressed condition.

This double tensioning of the irons implies considerable constructional complications of various kinds.

I provide a manner of performing the tri-axial (longitudinal and encircling) pre-compression by means of one system of reinforcements and one tensioning step on the reinforcement. This may be carried out by providing a system of reinforcements arranged along sufficiently inclined multiple thread helices. The coils are placed under the required tension by one step consisting in enlarging the mean pipe diameter by effect of a drop in pressure $D'_1 p$ in the manner described above (Fig. 22).

Figure 25:
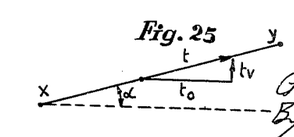
Figure 25 is a vectorial diagram of the tensions in a section of helical reinforcement.

Figure 25 shows a helical reinforcement XY developed on a plane tangential to the helix at the point X. The tangent of the angle $a$ denotes the steepness of the helix. In the same figure, $t$ denotes the tension set up in the helical reinforcement in the above described manner.

Obviously, setting up of a tension $t$ in the helical reinforcement necessitates radial deformations of the pipe increasing with the steepness $tga$ of the helix.

Consequently, if it is desired to obtain by equal plastic deformations throughout the pipe length a uniform constant tension throughout the helical reinforcement, it is necessary to provide a steepness $tga$ constant throughout the various helices and pipe length.

The tension $t$ of the reinforcement may be considered to be decomposed (Figure 25) into the two tensions $to$ and $tv$, which are horizontally and vertically directed, respectively. It is clear that the component $to$ performs the encircling action, while the component $tv$ sets up the longitudinal pre-compression in the conglomerate, which is particularly useful for withstanding any bending stress on the pipe on laying or use.

It is therefore sufficient to vary the angle $a$ of steepness of the helices in order to go over, according to the requirements in use of the pipe, from a mainly radial pre-compression (low value of $a$, system of helices with a small number of threads) to a mainly longitudinal pre-compression (high values of $a$, system of helices with a higher number of threads).

When the pipe is subjected in use to considerable bending moments varying according to a determined diagram over the tube regions, as this occurs with horizontal pipes resting on spaced supports, it may be advantageous to adopt the diagram of bending moments with suitable modifications of the reinforcements.

For instance, it is possible to superpose one or a plurality of systems of reinforcements on the main system just described. These systems of additional reinforcements are again in the form of helices as the main ones.

Since said reinforcements should perform a mainly longitudinal pre-compression, they should reasonably be of considerable steepness and with a large number of threads. In this case, I may provide a variable steepness main reinforcement, of which the steepness increases towards the region of high bending moments, in order to suit the steepness of the supplementary reinforcements. The final pipes are in this case of a mean diameter slightly variable over the pipe regions, the region subjected to the maximum bending moments being of a larger mean diameter. The variations in diameter, however, generally range within such narrow limits, that they do not practically disturb the hydrodynamic conditions of the fluids conveyed by said pipes.

Both main and additional reinforcements are generally formed by an even number $2n$ of helices, $n$ of said helices being left-handed and the remaining $n$ helices being right-handed of equal steepness. Over one full turn (360°) each of said helices consequently crosses $2n$ times the oppositely-handed helices.

Figure 26:
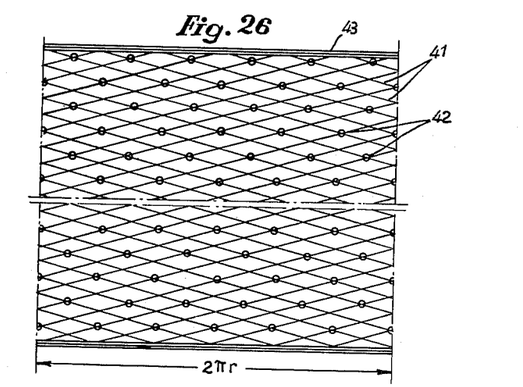
Figure 26 is a development in a plane of a helical reinforcement according to this invention.

A reinforcement of this kind is shown in Figure 26 developed in a plane.

The reinforcements are carried out by helically coiling about a cylindrical mold of the desired diameter round irons 41, generally high-strength steel wires. In the case of small diameter pipes up to 20 cm. bore, harmonic steel wires of 0.5 to 3 mm. diameter should be employed. The various oppositely wound helices are connected together at a number of crossings 42 by binding or welding. The ends of the helical reinforcements are secured to two end rings 43 made of an iron wire of suitable elasticity and small diameter, repeatedly superposed and welded.

The above described reinforcement may be removed from the mold and handled at will without any risk of disassembly. The reinforcement is secured to a suitable mold adapted to manufacture the conglomerate pipe by vibration or centrifugation.

Once the concrete pipes have fairly set, plasticizing and tensioning of the reinforcement are carried out.

My method as generically described above may be carried out in various manners. The following embodiment is therefore given merely by way of example.

I place two rims 44, 45 (Figures 27, 28) on the ends of the concrete pipe to be pre-compressed. The rims are made up of reinforced rubber rings 46, 47 deeply set into a circular steel shape. The rubber rings, which are adapted to elastically support the ends of the concrete pipe, are formed with an inner wing 48, 49 resting on the inner pipe surface and acting as sealing member against inner overpressures. The rims are connected together and clamped on the end faces of pipe T by means of one or a plurality of steel shafts 50 which are screw-threaded and provided with suitable end nuts 51. The shaft ends may further carry gripping members for transporting the pipes by means of suitable hauling devices.

Figure 27:
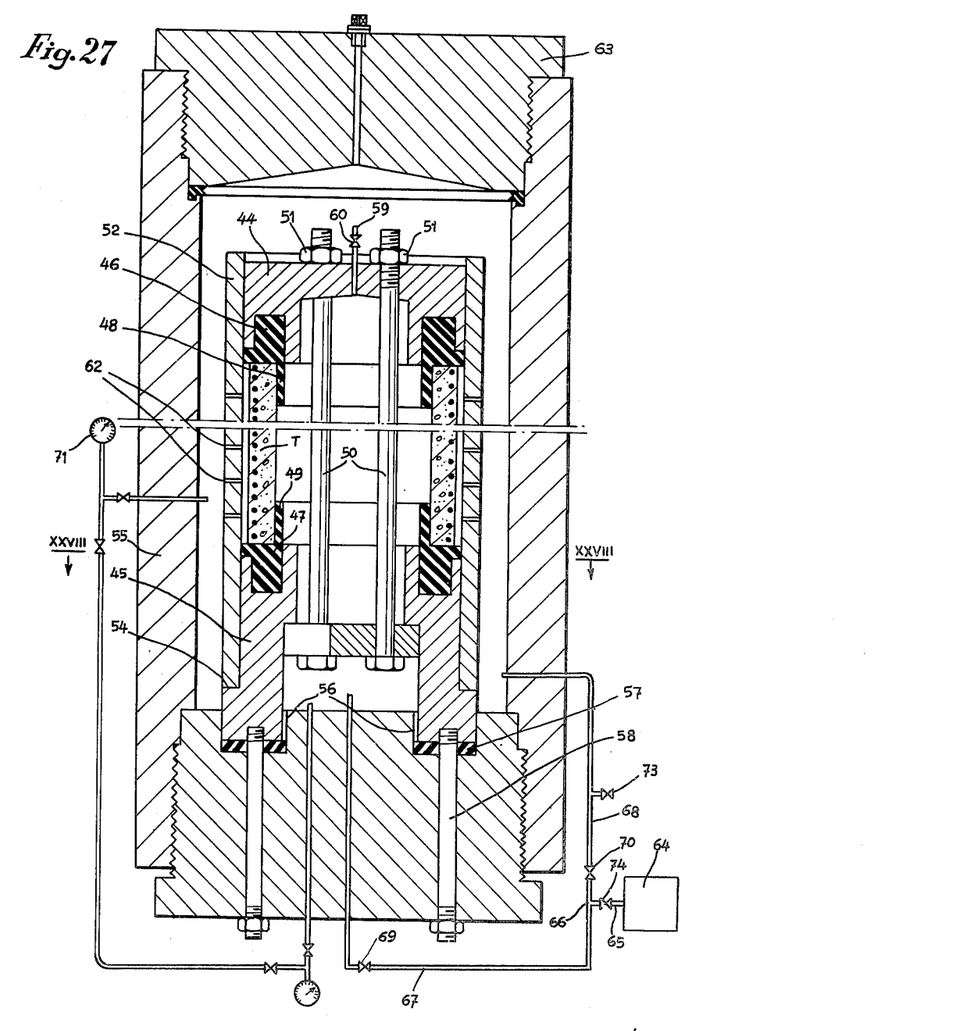
Figure 27 is a longitudinal section of an apparatus for manufacturing pre-stressed concrete pipes.
Figure 28:
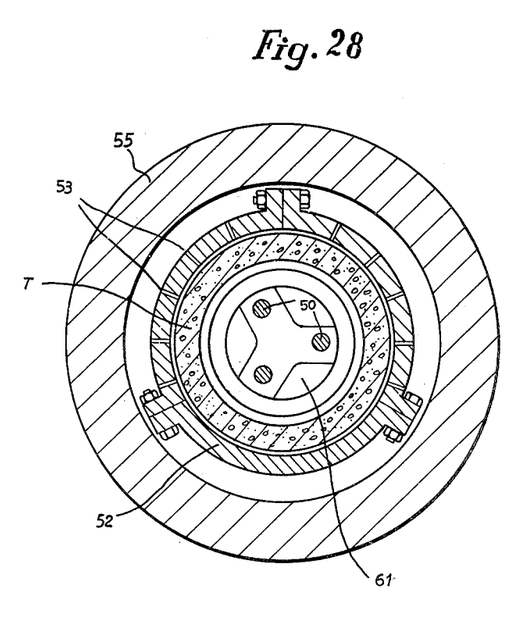
Figure 28 is a section on line XXVIII—XXVIII of Figure 27.

When the contemplated increase in diameter of the pipe is relatively large, that is, a few millimeters, after fitting the rims 46, 47, the concrete pipe is placed into a steel tube 52 which is disassemblable along three or more generatrices into as many cylindrical elements. When fitting of the conglomerate pipe into the steel tube meets with difficulty, the steel tube may be directly placed on the conglomerate pipe to be processed.

The bore of the disassemblable steel tube 52 approximately equals the final outer diameter of the deformed concrete pipe.

Obviously, said increase in diameter is proportionate to the diameter of the conglomerate pipe and increases with the steepness of the helices of the metal reinforcement, while it decreases with the modulus of elasticity under traction of the helical reinforcements used. When the increase in diameter the concrete pipe should undergo in order to properly tension the helical reinforcement (70 to 90 kgs./sq. mm.) shall be considerable, which facilitates checking and adjustment of the deformations, it is advisable to employ, instead of simple reinforcements, multiple reinforcements made up of two or a plurality of coiled wires.

A large number of holes 53 are uniformly bored throughout the surface of the diasassemblable steel tube 52 of which the inner surface is formed with a system of grooves for the sake of an easy flow of the tar from the outside to the inside of the mold 52 as this is being sunk and from the inside to the outside as the tube T is being expanded.

Once the concrete pipe is slipped into the disassemblable steel tube and the latter rests on the tooth 54 of the lower steel shape 45, the unit is placed into a metallic tubular container 55 of considerable wall thickness, similar to the container described above in connection with the processing of girders.

The container is partly filled with relatively fluid tar. The container bottom is formed with a recessed circular seating 56 receiving the lower metal rim 45 through the interposition of a rubber packing 57. The rim 45 may be strongly pressed against the packing 57 by means of a plurality of metal rods 58 which are screwed into the rim and may be tightened and locked from the outside in any suitable manner, for instance by means of a screw and nut mechanism.

The upper rim 44 is formed with a conduit 59 which may be closed from the outside by means of a valve 60 and serves to evacuate the inside of the concrete pipe as the latter sinks into the fluid tar which has free access through the spaces 61 (Figure 28) at the lower tube end, till it wholly fills the tube inside when the latter is fully sunk.

Should any difficulty be expected in access of the tar through the holes 62 and filling the full clearance between the outer surface of the conglomerate pipe and the inner surface of the metal tube 52, it may be obviated by dipping the concrete pipe 1 into a tar bath, before it is placed into the metal tube 52. When the tar has completely filled all the spaces within the metal tube 52, the valve 60 in the conduit 59 is tightly closed and the tubular container 55 is closed by means of a screw plug 63 of the type described above.

The tar in the container 55 is then placed under the hydrostatic pressure plasticizing the conglomerate by pumping in the manner described above further tar into the vessel 55 by means of the machinery 64. The tar flows into the container through a conduit 65 which is branched at 66 into two secondary conduits 67 and 68 provided with two valves 69, 70 which are open during this first step. The conduit 67 supplies fluid to the inside of the pipe to be processed, while conduit 68 supplies it to the space between said pipe and container 55. On reaching the desired pressure, the valve 70 is closed and further tar is pumped through conduit 67 till a drop of pressure exists between the inside and outside of the concrete pipe, which shall be determined in each case and be such as to produce the desired deformation of the pipe T and, consequently, tensioning of the reinforcements. The pressures are read in this case by means of two high-sensitiveness pressure gauges 71, 72.

As the pressure rises within the pipe T, the pressure externally thereof may be maintained within the desired limits by properly acting on the valve 73. The deformation of the conglomerate pipe T is stopped as soon as the outer wall thereof comes into contact with the metal tube 53. This may be ascertained by means of mechanical or electrical indicating apparatus as well as by the fact that, as the concrete pipe T comes into contact with the steel tube 52, the pressure which had slowly increased till that moment, sharply rises on account of the limited deformability of the steel tube which then starts cooperating with the concrete pipe T. The machines 64 are stopped, the valve 74 is closed, the valve 70 is opened in order to equalize the pressure outside and inside the pipe T. The valve 74 is re-opened and the pressure within the vessel 55 is gradually reduced to nought. The vessel is opened, the rim 45 is released and the element T with its metal lining 52 are removed. The conglomerate pipe is released from the disassemblable tube 52 and may be brought to a chamber in which it is maintained during some hours at a temperature of approximately 100° C. in order to remove the tar which may adhere thereto, whereafter the pipe may be used.

The method of manufacturing pipes of precompressed cementitious conglomerate may be carried out in various manners other than those described. More particularly, pressure fluids other than tar may be used and the conglomerate pipe walls may be waterproofed, if necessary, by coating them with elastic paints or providing rubber linings.

A tri-axial compression may be set up in the conglomerate in order to perform the required strong plastic deformations in a manner similar to that described in connection with girders (Figures 19 and 20) by using deformable metal molds, without the intermediate action of a pressure fluid.

What I claim is:

1. In a process of manufacturing reinforced concrete bodies comprising cementitious conglomerate and reinforcing elements, the steps of submerging a reinforced concrete body directly in a suitable liquid medium confining said medium and, subjecting it to pressure and subjecting said body to a suitably chosen system of forces equal in direction and sense to those to be withstood by the bodies in operation, said pressure and said forces being such as to cause substantially plastic deformations in the cementitious conglomerate without breakage and elastic deformations in the reinforcing elements, whereby desired stresses are set up in the reinforcing elements, and eliminating said pressure and said system of forces.

2. In a process of manufacturing reinforced concrete bodies comprising cementitious conglomerate and reinforcing elements, the steps of submerging a reinforced concrete body in a suitable liquid medium confining said medium and, subjecting it to a pressure of 700–2000 kgs. sq. cm. and subjecting the body to a system of forces equal in direction and sense to those to be withstood by the bodies in operation, chosen in a manner as to produce a controlled deformation of said body, whereby desired stresses are set up in the reinforcing elements, and eliminating said pressure and said system of forces.

3. In a process of manufacturing reinforced concrete bodies comprising cementitious conglomerate and reinforcing elements, the steps of submerging a reinforced concrete body directly in a suitable liquid medium confining said medium and, subjecting it to a pressure of 700–2000 kgs. sq. cm., subjecting the body to an additional uniform compression exerted on two opposed faces thereof so as to produce a substantially plastic deformation of the cementitious conglomerate and elastic deformation of the reinforcing elements, and eliminating said pressure and said additional compression.

4. In a process of manufacturing concrete girders having longitudinal reinforcing elements the steps of submerging the reinforced girder directly in a suitable liquid medium confining said medium and, subjecting it to a pressure of 700–2000 kgs. sq. cm. and subjecting said girder to a system of forces acting in a transverse direction so as to deform said girder till the predetermined stress is set up in the reinforcing elements, and eliminating said pressure and said forces.

5. In a process of manufacturing straight reinforced concrete girders the steps of submerging the girder having a certain initial curvature directly in a suitable liquid medium confining said medium and, subjecting it to a pressure of 700–2000 kgs. sq. cm., straightening said girder, and eliminating said pressure.

6. In a process of manufacturing reinforced concrete tubes consisting of cementitious conglomerate, the steps of submerging the reinforced concrete tube directly in a suitable liquid medium, subjecting said medium to a pressure sufficient for the body to undergo the desired deformations in the form of plastic deformations without breakage, expanding said tube in a radial direction by increasing the pressure acting on the liquid portion enclosed in the tube, reducing said last pressure to the value of that acting on the outer surface of the tube, and eliminating the pressure acting on a whole liquid.

7. In a process of manufacturing reinforced concrete tubes consisting of cementitious conglomerate, the steps of submerging the reinforced concrete tube directly in a suitable liquid medium, subjecting said medium to a pressure sufficient for the body to undergo the desired deformations in the form of plastic deformations without breakage, elongating the tube by adjusting the pressures acting on all the faces of said tube, adjusting successively said pressures in a manner as to expand the tube in radial direction, and eliminating all said pressures.

References Cited in the file of this patent

UNITED STATES PATENTS

| Number | Name | Date |
|---|---|---|
| 2,048,253 | Freyssinet | July 21, 1936 |
| 2,210,553 | Miller | Aug. 6, 1940 |
| 2,334,509 | Reeves | Nov. 16, 1943 |
| 2,395,216 | Fitzpatrick | Feb. 19, 1946 |
| 2,474,660 | Fitzpatrick | June 28, 1949 |
| 2,483,175 | Billner | Sept. 27, 1949 |
| 2,542,874 | Locatelli | Feb. 20, 1951 |

FOREIGN PATENTS

| Number | Country | Date |
|---|---|---|
| 338,934 | Great Britain | Nov. 25, 1930 |